(12) United States Patent
Nakashima et al.

(10) Patent No.: US 12,074,355 B2
(45) Date of Patent: Aug. 27, 2024

(54) CATALYST, ELECTRODE, MEMBRANE ELECTRODE ASSEMBLY, AND AIR BATTERY

(71) Applicants: ZEON CORPORATION, Tokyo (JP); KYUSHU UNIVERSITY, NATIONAL UNIVERSITY CORPORATION, Fukuoka (JP)

(72) Inventors: Naotoshi Nakashima, Fukuoka (JP); Ganesan Pandian, Fukuoka (JP); Hiroaki Shu, Tokyo (JP); Mitsugu Uejima, Tokyo (JP)

(73) Assignees: ZEON CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 491 days.

(21) Appl. No.: 17/594,184

(22) PCT Filed: Apr. 15, 2020

(86) PCT No.: PCT/JP2020/016587
§ 371 (c)(1),
(2) Date: Oct. 6, 2021

(87) PCT Pub. No.: WO2020/213647
PCT Pub. Date: Oct. 22, 2020

(65) Prior Publication Data
US 2022/0181665 A1 Jun. 9, 2022

(30) Foreign Application Priority Data
Apr. 15, 2019 (JP) .................................. 2019-077295

(51) Int. Cl.
*H01M 4/90* (2006.01)
*H01M 4/86* (2006.01)
(Continued)

(52) U.S. Cl.
CPC ....... *H01M 8/1004* (2013.01); *H01M 4/9008* (2013.01); *H01M 4/9041* (2013.01);
(Continued)

(58) Field of Classification Search
CPC ............ H01M 4/9041; H01M 4/9083; H01M 4/8663; H01M 12/08
See application file for complete search history.

(56) References Cited

U.S. PATENT DOCUMENTS

2010/0255402 A1* 10/2010 Heo .................. C01B 32/16
977/750
2016/0043409 A1* 2/2016 Park .................. H01M 4/8875
429/405

FOREIGN PATENT DOCUMENTS

CN 109235024 A 1/2019

OTHER PUBLICATIONS

EPO machine generated English translation of CN 109235024 A (Year: 2019).*

(Continued)

*Primary Examiner* — Christopher P Domone
*Assistant Examiner* — Kimberly Wyluda
(74) *Attorney, Agent, or Firm* — KENJA IP LAW PC

(57) ABSTRACT

Provided is a catalyst that has excellent oxygen reduction reaction (ORR) and oxygen evolution reaction (OER) catalytic activity and is useful as a catalyst for water electrolysis, an electrode catalyst for an air battery, or the like. The catalyst includes (A) either or both of Ni atoms and Fe atoms, (B) thiourea, and (C) fibrous carbon nanostructures. It is preferable that the catalyst includes (A) Ni atoms and Fe atoms, that the thiourea is coordinated with the Ni atoms and the Fe atoms, and that a mass ratio of the content of a Ni-thiourea coordination compound relative to the content of an Fe-thiourea coordination compound (Ni-thiourea coor- (Continued)

dination compound/Fe-thiourea coordination compound) is not less than 5/95 and not more than 70/30.

8 Claims, 1 Drawing Sheet

(51) Int. Cl.
    *H01M 8/1004*     (2016.01)
    *H01M 12/08*     (2006.01)

(52) U.S. Cl.
    CPC ......... *H01M 4/9083* (2013.01); *H01M 12/08* (2013.01); *H01M 4/8663* (2013.01)

(56) References Cited

OTHER PUBLICATIONS

Sep. 28, 2021, International Preliminary Report on Patentability issued in the International Patent Application No. PCT/JP2020/016587.

Jul. 14, 2020, International Search Report issued in the International Patent Application No. PCT/JP2020/016587.

Jun Yang et al., Decorating unoxidized-carbon nanotubes with homogeneous Ni—Co spinel nanocrystals show superior performance for oxygen evolution/reduction reactions, Scientific reports, 2017, vol. 7, Article No. 45384.

* cited by examiner

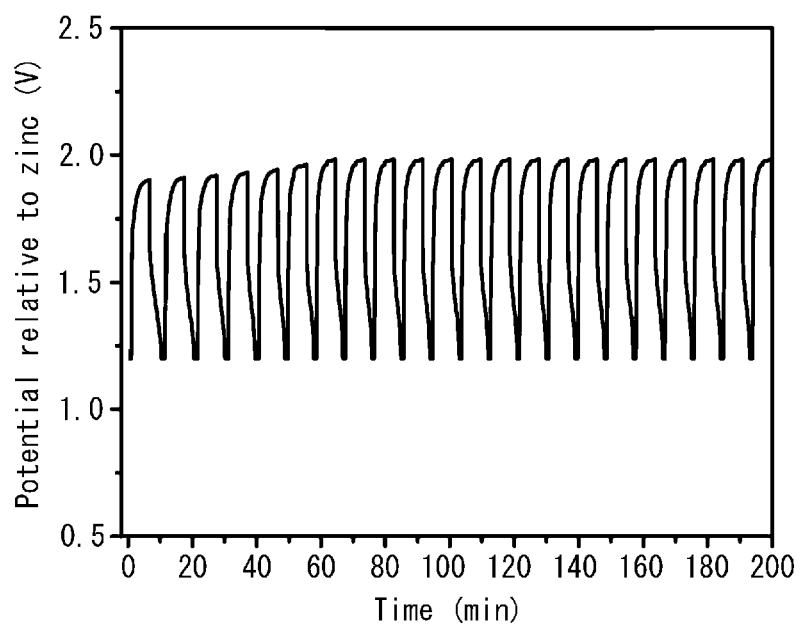

CATALYST, ELECTRODE, MEMBRANE ELECTRODE ASSEMBLY, AND AIR BATTERY

TECHNICAL FIELD

The present disclosure relates to a catalyst, an electrode, a membrane electrode assembly, and an air battery, and, in particular, relates to a catalyst that has excellent oxygen reduction reaction (ORR) and oxygen evolution reaction (OER) catalytic activity and that is useful as a catalyst for water electrolysis, an electrode catalyst for an air battery, or the like, an electrode that contains the aforementioned catalyst, a membrane electrode assembly that includes the aforementioned electrode, and a chargeable/dischargeable air battery that includes the aforementioned electrode or the aforementioned membrane electrode assembly.

BACKGROUND

The development of electrochemical energy storage systems such as fuel cells, redox fuels, supercapacitors, and rechargeable batteries has been attracting attention due to demand for mobile electronic devices, electric vehicles, and efficient use of renewable energy.

In particular, there has been focus on the development of efficient and highly durable bifunctional electrode catalysts that display both oxygen reduction reaction (ORR) and oxygen evolution reaction (OER) functionality.

Although conventionally used precious metal-based catalysts such as platinum (Pt) and iridium(IV) oxide ($IrO_2$) nanoparticles are efficient electrode catalysts, they have drawbacks of high cost and inadequacy in terms of normally only displaying functionality in one or other of oxygen reduction reaction (ORR) and oxygen evolution reaction (OER). Consequently, the development of non-metal catalysts formed of elements that are abundantly present on Earth has become highly desirable in recent years. Although progress has been made in the development of efficient bifunctional catalysts for oxygen reduction reaction (ORR) and oxygen evolution reaction (OER) using transition metal oxides, transition metal sulfides, doped nanocarbons, and so forth, there is an issue that these bifunctional catalysts do not necessarily have high performance.

In order to resolve this issue, oxygen reduction reaction (ORR) and oxygen evolution reaction (OER) bifunctional catalysts have been obtained by, for example, loading homogeneous $Ni_xCo_{3-x}O_4$ spinel oxide nanoparticles onto multi-walled carbon nanotubes (MWCNTs) that have been surface coated with pyridine-containing polybenzimidazole (PyPBI) (for example, refer to Non-Patent Literature (NPL) 1).

CITATION LIST

Patent Literature

NPL 1: J. Yang, T. Fujigaya, N. Nakashima, "Decorating unoxidized-carbon nanotubes with homogeneous Ni—Co spinel nanocrystals show superior performance for oxygen evolution/reduction reactions", Sci. Rep., 2017, 7, art. no. 45384

SUMMARY

Technical Problem

However, even the catalyst described in NPL 1 leaves room for improvement in terms of achieving a combination of sufficiently high levels of both oxygen reduction reaction (ORR) and oxygen evolution reaction (OER) catalytic activity.

Accordingly, the present disclosure is directed at a problem of providing a catalyst that has excellent oxygen reduction reaction (ORR) and oxygen evolution reaction (OER) catalytic activity and that is useful as a catalyst for water electrolysis, an electrode catalyst for an air battery, or the like, an electrode that contains the aforementioned catalyst, a membrane electrode assembly that includes the aforementioned electrode, and a chargeable/dischargeable air battery that includes the aforementioned electrode or the aforementioned membrane electrode assembly.

Solution to Problem

The inventors made extensive studies to achieve the foregoing object. The inventors discovered that a catalyst including (A) either or both of Ni atoms and Fe atoms, (B) thiourea, and (C) fibrous carbon nanostructures has excellent oxygen reduction reaction (ORR) and oxygen evolution reaction (OER) catalytic activity, and, in this manner, completed the present disclosure.

Specifically, the present disclosure aims to advantageously solve the problem set forth above, and a presently disclosed catalyst comprises: (A) either or both of Ni atoms and Fe atoms; (B) thiourea; and (C) fibrous carbon nanostructures. As a result of the presently disclosed catalyst including (A) either or both of Ni atoms and Fe atoms, (B) thiourea, and (C) fibrous carbon nanostructures in this manner, the presently disclosed catalyst has excellent oxygen reduction reaction (ORR) and oxygen evolution reaction (OER) catalytic activity and is useful as a catalyst for water electrolysis, an electrode catalyst for an air battery, or the like.

It is preferable that the presently disclosed catalyst comprises (A) Ni atoms and Fe atoms, the thiourea is coordinated with the Ni atoms and the Fe atoms, and a mass ratio of content of a Ni-thiourea coordination compound relative to content of an Fe-thiourea coordination compound, expressed as Ni-thiourea coordination compound/Fe-thiourea coordination compound, is not less than 5/95 and not more than 70/30. When (A) Ni atoms and Fe atoms are included, the thiourea is coordinated with the Ni atoms and the Fe atoms, and the mass ratio of the content of a Ni-thiourea coordination compound relative to the content of an Fe-thiourea coordination compound (Ni-thiourea coordination compound/Fe-thiourea coordination compound) is not less than 5/95 and not more than 70/30, the presently disclosed catalyst has even better oxygen reduction reaction (ORR) and oxygen evolution reaction (OER) catalytic activity.

The presently disclosed catalyst preferably further comprises (D) a polymer represented by general formula (1), shown below. When (D) a polymer represented by general formula (1), shown below, is further included, dispersibility of the catalyst in a solvent can be improved, and durability of the catalyst can be improved.

General Formula (1)

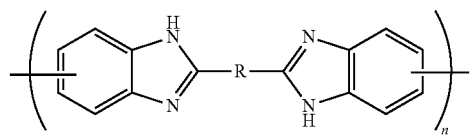

(In general formula (1), R indicates a phenylene group or a divalent group represented by structural formula (X), shown below, and n is an integer of 10 or more.)

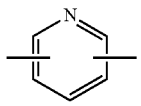

Structural Formula (X)

In the presently disclosed catalyst, the fibrous carbon nanostructures are preferably single-walled carbon nanotubes. When the fibrous carbon nanostructures are single-walled carbon nanotubes, the presently disclosed catalyst has even better oxygen reduction reaction (ORR) and oxygen evolution reaction (OER) catalytic activity.

In the presently disclosed catalyst, the fibrous carbon nanostructures preferably have a specific surface area of 800 $m^2/g$ or more. When the specific surface area of the fibrous carbon nanostructures is 800 $m^2/g$ or more, the presently disclosed catalyst has a larger catalytically active area and even better oxygen reduction reaction (ORR) and oxygen evolution reaction (OER) catalytic activity.

Note that the term "specific surface area" as used in the present disclosure refers to nitrogen adsorption specific surface area measured by the BET method.

Moreover, the present disclosure aims to advantageously solve the problem set forth above, and a presently disclosed electrode comprises the catalyst set forth above. The presently disclosed electrode has excellent oxygen reduction reaction (ORR) and oxygen evolution reaction (OER) catalytic activity as an electrode as a result of containing the catalyst set forth above.

Furthermore, the present disclosure aims to advantageously solve the problem set forth above, and a presently disclosed membrane electrode assembly comprises the electrode set forth above.

Also, the present disclosure aims to advantageously solve the problem set forth above, and a presently disclosed air battery comprises the electrode set forth above or the membrane electrode assembly set forth above. The presently disclosed air battery is chargeable and dischargeable and has excellent electricity generation efficiency as a result of including the electrode set forth above or the membrane electrode assembly set forth above.

Note that the term "air battery" as used in the present disclosure refers to a battery in which oxygen in air is used as a positive electrode active material and in which a metal (zinc or lithium) is used as a negative electrode active material (i.e., a zinc-air battery or a lithium-air battery).

Advantageous Effect

According to the present disclosure, it is possible to provide a catalyst that has excellent oxygen reduction reaction (ORR) and oxygen evolution reaction (OER) catalytic activity and is useful as a catalyst for water electrolysis, an electrode catalyst for an air battery, or the like. Moreover, according to the present disclosure, it is possible to provide an electrode that contains the aforementioned catalyst, a membrane electrode assembly that includes the aforementioned electrode, and a chargeable/dischargeable air battery that includes the aforementioned electrode or the aforementioned membrane electrode assembly.

BRIEF DESCRIPTION OF THE DRAWINGS

In the accompanying drawings,

FIG. 1 is a graph illustrating a charge/discharge characteristic for a zinc-air battery that was produced with a catalyst B produced in Example 2 as a positive electrode catalyst.

DETAILED DESCRIPTION

The following provides a detailed description of the present disclosure, divided into sections for 1) a catalyst, 2) an electrode, 3) a membrane electrode assembly, and 4) an air battery. However, the present disclosure is not limited to the following embodiments.

(Catalyst)

The presently disclosed catalyst includes (A) either or both of Ni atoms and Fe atoms, (B) thiourea, and (C) fibrous carbon nanostructures, and may optionally further include (D) a specific polymer and other components. Note that it is preferable that the presently disclosed catalyst includes Ni atoms and Fe atoms.

The presently disclosed catalyst has excellent oxygen reduction reaction (ORR) and oxygen evolution reaction (OER) catalytic activity and is useful as a catalyst for water electrolysis, an electrode catalyst for an air battery, or the like.

In the presently disclosed catalyst, it is preferable that either or both of Ni atoms and Fe atoms having thiourea coordinated therewith (i.e., a thiourea coordination compound (transition metal chalcogenide)) are loaded onto fibrous carbon nanostructures that have been coated with the subsequently described (D) polymer. By loading a thiourea coordination compound (transition metal chalcogenide) onto fibrous carbon nanostructures that have been coated with the subsequently described (D) polymer in this manner, it is possible to produce a catalyst having excellent catalytic activity and durability without introducing defect sites into the fibrous carbon nanostructures for loading of the coordination compound.

<(A) Ni Atoms and/or Fe Atoms and (B) Thiourea>

The (A) Ni atoms and/or Fe atoms in the presently disclosed catalyst may be present individually as atoms or may be present as an oxide. Alternatively, the (A) Ni atoms and/or Fe atoms may be coordinated with the (B) thiourea to form a thiourea coordination compound (transition metal chalcogenide) such as indicated in general formula (Q), shown below. These each function as a catalytically active component.

Moreover, the (B) thiourea in the presently disclosed catalyst may be present individually as thiourea or may be coordinated with the (A) Ni atoms and/or Fe atoms to form a thiourea coordination compound (transition metal chalcogenide) such as illustrated in general formula (Q), shown below.

A coordination compound of the (A) Ni atoms and/or Fe atoms and the (B) thiourea functions as a catalytically active component and can be loaded onto (C) fibrous carbon nanostructures that have been coated with the subsequently described (D) polymer.

General Formula (Q)

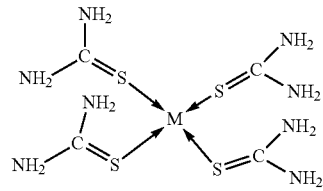

In general formula (Q), M represents a Ni (nickel) atom and/or an F e (iron) atom.

<<Content of Ni Atoms>>

In a case in which the presently disclosed catalyst includes Ni atoms, the content of Ni atoms in the presently disclosed catalyst is preferably 0.5 mass % or more, more preferably 1 mass % or more, and particularly preferably 2 mass % or more, and is preferably 10 mass % or less, more preferably 7 mass % or less, and particularly preferably 5 mass % or less.

When the content of Ni atoms is within any of the ranges set forth above, catalytic activity can be further improved.

Note that the content of Ni atoms in the presently disclosed catalyst can be measured using energy dispersive X-ray spectroscopy (EDX), an element mapping image, or the like, for example. Moreover, in a case in which Ni atoms are used in the form of a Ni-thiourea coordination compound in production of the catalyst, the content thereof can be calculated based on the amount of the Ni-thiourea coordination compound that is used.

<<Content of Fe Atoms>>

In a case in which the presently disclosed catalyst includes Fe atoms, the content of Fe atoms in the presently disclosed catalyst is preferably 2 mass % or more, more preferably 4 mass % or more, and particularly preferably 6 mass % or more, and is preferably 10 mass % or less.

When the content of Fe atoms is within any of the ranges set forth above, catalytic activity can be further improved.

Note that the content of Fe atoms in the presently disclosed catalyst can be measured using energy dispersive X-ray spectroscopy (EDX), an element mapping image, or the like, for example. Moreover, in a case in which Fe atoms are used in the form of an Fe-thiourea coordination compound in production of the catalyst, the content thereof can be calculated based on the amount of the Fe-thiourea coordination compound that is used.

<<Content of Thiourea>>

The content of thiourea in the presently disclosed catalyst is preferably 10 mass % or more, more preferably 15 mass % or more, and particularly preferably 20 mass % or more, and is preferably 70 mass % or less, more preferably 65 mass % or less, and particularly preferably 60 mass % or less. Sufficient coordination of thiourea with Ni atoms and/or Fe atoms is possible when the content thereof is not less than any of the lower limits set forth above, whereas a catalyst having sufficiently high catalytic activity can be synthesized when the content is not more than any of the upper limits set forth above.

Note that the content of thiourea in the presently disclosed catalyst can be measured using energy dispersive X-ray spectroscopy (EDX), an element mapping image, or the like, for example. Moreover, in a case in which thiourea is used in the form of a thiourea coordination compound in production of the catalyst, the content thereof can be calculated based on the amount of the thiourea coordination compound that is used.

<<Content of Thiourea Coordination Compound (Transition Metal Chalcogenide)>>

The content of a thiourea coordination compound (Ni-thiourea coordination compound in which thiourea is coordinated with a Ni atom and/or Fe-thiourea coordination compound in which thiourea is coordinated with an Fe atom) in the presently disclosed catalyst is preferably 1 mass % or more, more preferably 2 mass % or more, and particularly preferably 3 mass % or more, and is preferably 60 mass % or less, more preferably 50 mass % or less, and particularly preferably 40 mass % or less.

Catalytic activity can be sufficiently improved when the content of the thiourea coordination compound is not less than any of the lower limits set forth above, whereas a catalyst having sufficiently high catalytic activity can be synthesized when the content of the thiourea coordination compound is not more than any of the upper limits set forth above.

Note that the content of the thiourea coordination compound in the presently disclosed catalyst can be measured using energy dispersive X-ray spectroscopy (EDX), an element mapping image, or the like, for example. Moreover, in the case in which the thiourea coordination compound is used in the form of a thiourea coordination compound in production of the catalyst, the content thereof can be calculated based on the amount of the thiourea coordination compound that is used.

Note that the electronic state of the thiourea coordination compound in the presently disclosed catalyst can be measured using X-ray photoelectron spectroscopy (XPS), for example, and can be calculated based on the charged amount of the thiourea coordination compound in production of the catalyst.

<<Mass Ratio of Ni-Thiourea Coordination Compound Content and Fe-Thiourea Coordination Compound Content>>

In the presently disclosed catalyst, a mass ratio of the content of a Ni-thiourea coordination compound in which thiourea is coordinated with a Ni atom relative to the content of an Fe-thiourea coordination compound in which thiourea is coordinated with an Fe atom (Ni-thiourea coordination compound/Fe-thiourea coordination compound) is preferably 5/95 or more, more preferably 10/90 or more, even more preferably 15/85 or more, and particularly preferably 20/80 or more, and is preferably 70/30 or less, more preferably 60/40 or less, even more preferably 50/50 or less, and particularly preferably 40/60 or less. In general, this mass ratio is roughly equal to a mass ratio of the charged amount of a Ni-thiourea coordination compound (typically Ni(Thiourea)$_4$(NO$_3$)$_2$) relative to the charged amount of an Fe-thiourea coordination compound (typically Fe(Thiourea)$_4$Cl$_2$).

When this mass ratio is within any of the ranges set forth above, catalytic activity can be further improved.

<<Particle Diameter of Thiourea Coordination Compound (Transition Metal Chalcogenide)>>

The thiourea coordination compound is preferably nanoparticles. The surface area of a catalytically active component is increased and the catalytic activity of the catalyst is raised through the thiourea coordination compound being nanoparticles in this manner. Note that the thiourea coordination compound is presumed to be loaded in the form of nanoparticles on the (C) fibrous carbon nanostructures coated with the (D) polymer.

In a case in which the thiourea coordination compound is nanoparticles, the average particle diameter of these nanoparticles is preferably 10 μm or less. The average diameter of the nanoparticles can be determined by observing the nanoparticles under a transmission electron microscope and measuring the particle diameters of 100 randomly selected nanoparticles based on an image thereof.

<<Production Method of Thiourea Coordination Compound (Transition Metal Chalcogenide)>>

Examples of methods by which the thiourea coordination compound may be produced include (i) a method in which a mixture of nickel(II) nitrate and thiourea is refluxed at 60° C. in 50 mL of n-butanol for 2 hours and is then gradually cooled to produce a Ni-thiourea tetracoordinate compound (Ni(Thiourea)$_4$(NO$_3$)$_2$) in which four molecules of thiourea are coordinated with a Ni atom, and (ii) a method in which a mixture of iron(II) chloride tetrahydrate and thiourea is refluxed at 80° C. in ethanol (50 mL) for 2 hours and is then left overnight at 0° C. to produce an Fe-thiourea tetracoordinate compound (Fe(Thiourea)$_4$Cl$_2$) in which four molecules of thiourea are coordinated with an Fe atom.

<(C) Fibrous Carbon Nanostructures>

Specific examples of fibrous carbon nanostructures that can be used include structures formed through stacking of conical structures such as cup-stacked carbon nanotubes; circular tube-shaped carbon nanostructures such as carbon nanobuds and carbon nanotubes (CNTs); and carbon nanostructures such as graphene nanoribbons resulting from a six-membered ring network of carbon being formed in a flattened tube shape, which are an example of non-circular tube-shaped carbon nanostructures. One of these types of fibrous carbon nanostructures may be used individually, or two or more of these types of fibrous carbon nanostructures may be used together. Also note that carbon structures such as commercially available carbon black and Ketjenblack may be used together with the fibrous carbon nanostructures described above.

Of the examples given above, fibrous carbon nanostructures including CNTs are more preferably used as the fibrous carbon nanostructures. Note that the fibrous carbon nanostructures may be composed of only CNTs. By using fibrous carbon nanostructures including CNTs, it is possible to efficiently impart characteristics to the obtained catalyst, such as sufficient catalytic activity for use as a catalyst for water electrolysis, an electrode catalyst for an air battery, or the like, even using a small amount of the fibrous carbon nanostructures.

The CNTs among the fibrous carbon nanostructures may be single-walled carbon nanotubes and/or multi-walled carbon nanotubes without any specific limitations. The CNTs are preferably carbon nanotubes having from 1 to 5 walls, and are more preferably single-walled carbon nanotubes. One of these types of CNTs may be used individually, or two or more of these types of CNTs may be used together. The use of carbon nanotubes having fewer walls increases the specific surface area and makes it possible to efficiently impart characteristics such as the desired catalytic activity and durability (stability) to the obtained catalyst even using a small amount of the carbon nanotubes.

The average diameter of the fibrous carbon nanostructures is preferably 1 nm or more, and is preferably 60 nm or less, more preferably 30 nm or less, and particularly preferably 10 nm or less. When the average diameter of the fibrous carbon nanostructures is 1 nm or more, dispersibility of the fibrous carbon nanostructures can be increased, and characteristics such as catalytic activity can be stably imparted to the obtained catalyst. Moreover, when the average diameter of the fibrous carbon nanostructures is 60 nm or less, characteristics such as the desired catalytic activity can be efficiently imparted to the obtained catalyst even using a small amount of the fibrous carbon nanostructures.

Note that the "average diameter of the fibrous carbon nanostructures" referred to in the present disclosure can be determined by measuring the diameters (external diameters) of 20 fibrous carbon nanostructures, for example, in a transmission electron microscope (TEM) image and then calculating a number-average value of the measured diameters.

The fibrous carbon nanostructures are preferably fibrous carbon nanostructures for which a ratio ($3\sigma$/Av) of a value $3\sigma$, which is obtained by multiplying the diameter standard deviation ($\sigma$: sample standard deviation) by 3, relative to the average diameter (Av) is more than 0.20 and less than 0.60, more preferably fibrous carbon nanostructures for which $3\sigma$/Av is more than 0.25, and particularly preferably fibrous carbon nanostructures for which $3\sigma$/Av is more than 0.40. By using fibrous carbon nanostructures for which $3\sigma$/Av is more than 0.20 and less than 0.60, the performance of the obtained catalyst can be sufficiently improved.

The average diameter (Av) and the standard deviation ($\sigma$) of the fibrous carbon nanostructures may be adjusted by changing the production method and the production conditions of the fibrous carbon nanostructures, or may be adjusted by combining a plurality of types of fibrous carbon nanostructures obtained by different production methods.

The fibrous carbon nanostructures that are typically used take a normal distribution when a plot is made of diameter measured as described above on a horizontal axis and probability density on a vertical axis, and a Gaussian approximation is made.

The average length of the fibrous carbon nanostructures is preferably 10 μm or more, more preferably 50 μm or more, and particularly preferably 80 μm or more, and is preferably 600 μm or less, more preferably 500 μm or less, and particularly preferably 400 μm or less. When the average length is 10 μm or more, the electrical conductivity and durability (stability) of the obtained catalyst can be improved using a small amount of the fibrous carbon nanostructures. Moreover, when the average length is 600 μm or less, coatability onto a substrate can be improved in a situation in which the catalyst is applied onto a specific substrate in the form of a dispersion liquid.

Note that the average length of the "fibrous carbon nanostructures" referred to in the present disclosure can be determined by measuring the lengths of 20 fibrous carbon nanostructures, for example, in a scanning electron microscope (SEM) image, and then calculating a number-average value of the measured lengths.

The fibrous carbon nanostructures normally have an aspect ratio of more than 10. Note that the aspect ratio of the fibrous carbon nanostructures can be determined by measuring the diameters and lengths of 100 randomly selected fibrous carbon nanostructures using a scanning electron microscope or a transmission electron microscope, and then calculating an average value of the ratio of diameter and length (length/diameter).

The specific surface area of the fibrous carbon nanostructures is preferably 800 m$^2$/g or more, more preferably 1,000 m$^2$/g or more, even more preferably 1,100 m$^2$/g or more, and particularly preferably 1,400 m$^2$/g or more, and is preferably 2,000 m$^2$/g or less, more preferably 1,800 m$^2$/g or less, and particularly preferably 1,600 m$^2$/g or less. When the specific surface area of the fibrous carbon nanostructures is 800 m$^2$/g or more, the dispersibility of the fibrous carbon nanostructures can be increased, and characteristics such as the desired catalytic activity can be efficiently imparted to the obtained catalyst using a small amount of the fibrous carbon nanostructures. Moreover, when the specific surface area of the fibrous carbon nanostructures is 2,000 m$^2$/g or less, dispersion liquid coatability can be stabilized in a case in which the catalyst is used in the form of a dispersion liquid and is applied onto a specific substrate in the form of a dispersion liquid.

A t-plot for the fibrous carbon nanostructures obtained from an adsorption isotherm preferably exhibits a convex upward shape in a state in which the fibrous carbon nanostructures have not undergone opening formation treatment. Note that a "t-plot" can be obtained by, in an adsorption isotherm of the fibrous carbon nanostructures measured by the nitrogen gas adsorption method, converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

In a substance having pores at its surface, the growth of the adsorbed layer of nitrogen gas is categorized into the following processes (1) to (3). The gradient of the t-plot changes in accordance with processes (1) to (3).

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen In a t-plot having a convex upward shape, the plot is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that many openings are present in carbon nanostructures constituting the fibrous carbon nanostructures.

A bending point of the t-plot for the fibrous carbon nanostructures is preferably within a range satisfying 0.2≤ (nm)≤1.5, more preferably within a range of 0.45≤(nm)≤1.5, and particularly preferably within a range of 0.55≤(nm)≤1.0. When the bending point of the t-plot for the fibrous carbon nanostructures is within any of the ranges set forth above, the dispersibility of the fibrous carbon nanostructures can be increased, and characteristics such as the desired catalytic activity can be efficiently imparted to the obtained catalyst using a small amount of the fibrous carbon nanostructures. More specifically, the fibrous carbon nanostructures may readily aggregate and have reduced dispersibility when the value of the bending point is less than 0.2, whereas the fibrous carbon nanostructures may readily become entangled and have reduced dispersibility when the value of the bending point is more than 1.5.

The "position of the bending point" is defined as an intersection point of a linear approximation A for the above-described process (1) and a linear approximation B for the above-described process (3).

A ratio (S2/S1) of internal specific surface area S2 relative to total specific surface area S1 obtained from the t-plot for the fibrous carbon nanostructures is preferably not less than 0.05 and not more than 0.30. When the value of S2/S1 of the fibrous carbon nanostructures is within the range set forth above, the dispersibility of the fibrous carbon nanostructures can be increased, and characteristics such as the desired catalytic activity can be efficiently imparted to the obtained catalyst using a small amount of the fibrous carbon nanostructures.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of the total specific surface area S1 and the internal specific surface area S2 based on t-plot analysis can be performed using a BELSORP®-mini (BELSORP is a registered trademark in Japan, other countries, or both), for example, which is a commercially available measurement apparatus produced by Bel Japan Inc.

Moreover, the fibrous carbon nanostructures including CNTs that are suitable as the fibrous carbon nanostructures preferably have a radial breathing mode (RBM) peak when evaluated by Raman spectroscopy. Note that an RBM is not present in the Raman spectrum of fibrous carbon nanostructures composed of only multi-walled carbon nanotubes having three or more walls.

A ratio (G/D ratio) of G band peak intensity relative to D band peak intensity in a Raman spectrum for the fibrous carbon nanostructures including CNTs is preferably not less than 0.5 and not more than 10.0, and more preferably not less than 1.0 and not more than 5.0. When the G/D ratio is not less than 0.5 and not more than 10.0, characteristics such as the desired catalytic activity can be imparted to the obtained catalyst.

In elemental analysis of the fibrous carbon nanostructures including CNTs by XPS, the oxygen atom content relative to the total of carbon atoms and oxygen atoms is preferably 5 atom % or less, more preferably 2 atom % or less, and particularly preferably 1 atom % or less. When the oxygen atom content is within any of the preferable ranges set forth above, characteristics such as the desired catalytic activity can be imparted well to the obtained catalyst.

The proportion constituted by carbon atoms in the fibrous carbon nanostructures including CNTs according to CHN elemental analysis is preferably 85 mass % or more, more preferably 90 mass % or more, even more preferably 95 mass % or more, and particularly preferably 98 mass % or more, and the proportion constituted by hydrogen atoms is preferably 1 mass % or less, more preferably 0.8 mass % or less, more preferably 0.3 mass % or less, and particularly preferably 0.1 mass % or less.

When the proportion constituted by carbon atoms (or hydrogen atoms) is within any of the preferable ranges set forth above, characteristics such as the desired catalytic activity can be imparted well to the obtained catalyst.

The fibrous carbon nanostructures including CNTs can be produced using a known CNT synthesis method such as arc discharge, laser ablation, or chemical vapor deposition (CVD) without any specific limitations. More specifically, the fibrous carbon nanostructures including CNTs can, for example, be efficiently produced in accordance with a method in which, during synthesis of CNTs through chemical vapor deposition (CVD) by supplying a feedstock compound and a carrier gas onto a substrate having a catalyst layer for carbon nanotube production on the surface thereof, a trace amount of an oxidant (catalyst activating material) is provided in the system so as to dramatically improve the catalytic activity of the catalyst layer (super growth method; refer to WO2006/011655A1). Hereinafter, carbon nanotubes that are obtained by the super growth method are also referred to as "SGCNTs". Fibrous carbon nanostructures that are produced by the super growth method may be composed of only SGCNTs or may, for example, include other carbon nanostructures such as non-circular tube-shaped carbon nanostructures in addition to SGCNTs.

Note that in production of the SGCNTs, the catalyst layer may be formed on the surface of the substrate by a wet process, and a feedstock gas having acetylene as a main component may be used.

The obtained SGCNTS are composed mainly of single-walled CNTs, preferably have a BET specific surface area according to nitrogen gas adsorption of not less than 800 m²/g and not more than 2,000 m²/g, and preferably have a mass density of not less than 0.002 g/cm³ and not more than 0.2 g/cm³. Moreover, when the diameters of 100 SGCNTs are measured at random using a transmission electron microscope, the average diameter (Av) is preferably not less than 1 nm and not more than 60 nm, 3σ/Av is preferably not less than 0.20 and not more than 0.60, and the average length is preferably not less than 10 μm and not more than 600 μm.

<<Content of Fibrous Carbon Nanostructures>>

The content of the fibrous carbon nanostructures in the presently disclosed catalyst is preferably 3 mass % or more, more preferably 5 mass % or more, and particularly preferably 8 mass % or more, and is preferably 60 mass % or less, more preferably 50 mass % or less, and particularly preferably 40 mass % or less.

High catalytic activity is displayed through the content of the fibrous carbon nanostructures being not less than any of the lower limits set forth above.

Note that the content of the fibrous carbon nanostructures in the presently disclosed catalyst can be measured using energy dispersive X-ray spectroscopy (EDX), an element mapping image, or the like, for example. Moreover, the content can be calculated based on the amount of the fibrous carbon nanostructures used in production of the catalyst.

<(D) Polymer>

It is preferable that the presently disclosed catalyst further includes (D) a polymer, and more preferable that the (D) polymer coats the (C) fibrous carbon nanostructures.

The (D) polymer is a polymer represented by general formula (1), shown below, and may, for example, be polybenzimidazole (PBI) represented by general formula (2), shown below, or pyridine-containing polybenzimidazole (PyPBI) represented by general formula (3), shown below.

General Formula (1)

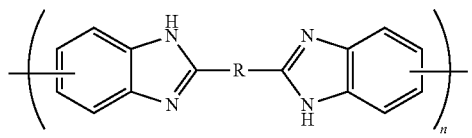

In general formula (1), R indicates a phenylene group or a divalent group represented by structural formula (X), shown below, and n may be any integer of 10 or more, but is preferably an integer of 500 or less.

Structural Formula (X)

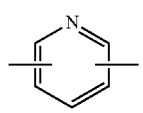

General Formula (2)

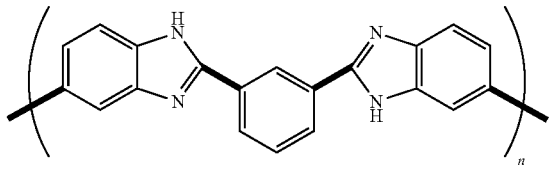

In general formula (2), n may be any integer of 10 or more, but is preferably an integer of 500 or less.

General Formula (3)

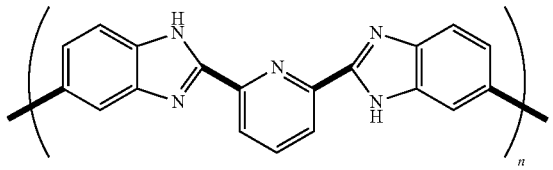

In general formula (3), n may be any integer of 10 or more, but is preferably an integer of 500 or less.

<<Content of (D) Polymer>>

The content of the (D) polymer in the presently disclosed catalyst is preferably 2 mass % or more, more preferably 3 mass % or more, and particularly preferably 4 mass % or more, and is preferably 20 mass % or less, more preferably 15 mass % or less, and particularly preferably 10 mass % or less.

A catalyst having high catalytic activity is obtained through the content of the (D) polymer being not less than any of the lower limits set forth above. Note that the content of the (D) polymer in the presently disclosed catalyst can be measured using energy dispersive X-ray spectroscopy (EDX), an element mapping image, or the like, for example. Moreover, the content can be calculated based on the amount of the (D) polymer used in production of the catalyst.

<<Coating>>

In production of the presently disclosed catalyst, it is preferable that the fibrous carbon nanostructures are coated with the polymer in advance of loading individual Ni atoms, individual Fe atoms, a Ni oxide, an Fe oxide, or a thiourea coordination compound that functions as a catalytically active component. Coating of the polymer onto the fibrous carbon nanostructures can improve the dispersibility of the catalyst in a solvent.

Note that coating of the fibrous carbon nanostructures with the polymer can be performed by, for example, dispersing the fibrous carbon nanostructures (15 mg of single-walled carbon nanotubes) and the polymer (5 mg of PBI) in a solvent (40 mL of dimethylacetamide (DMAc)), and performing ultrasonication thereof. The ultrasonication time can be set as not less than 1 hour and not more than 80 hours (for example, 37 hours).

Coating of the fibrous carbon nanostructures with the polymer is subsequently fixed by washing, separation, and drying as appropriate.

The washing method can be alcohol washing or the like, for example.

The separation method can be filtration, centrifugal separation, or the like, for example.

The drying method can be vacuum drying, natural drying, evaporation to dryness, drying using a rotary evaporator, spray dryer, or drum dryer, or the like, for example. The drying time may be selected as appropriate depending on the method that is adopted. The drying temperature is preferably not lower than 30° C. and not higher than 800° C., and more preferably not lower than 50° C. and not higher than 500° C. The drying may be carried out in an inert gas (non-oxidizing) atmosphere such as argon, nitrogen, or helium.

<Production Method of Catalyst>

The presently disclosed catalyst may be obtained by, for example, performing first ultrasonication of fibrous carbon nanostructures, which may be surface coated with the (D) polymer, in a dispersion medium, subsequently adding a thiourea coordination compound (Ni-thiourea coordination compound and/or Fe-thiourea coordination compound), performing second ultrasonication, performing solvothermal synthesis (hydrothermal synthesis), performing thermal-vacuum drying, and so forth.

<<Dispersion Medium>>

The dispersion medium may be water, isopropanol (IPA), methanol, N-methylpyrrolidone (NMP), or the like. In particular, a mixture of isopropanol (IPA), water, and Nafion® (Nafion is a registered trademark in Japan, other countries, or both; copolymer of tetrafluoroethylene and perfluoro[2-(fluorosulfonylethoxy)propyl vinyl ether]), such as a mixture thereof having a volume ratio of 1:4:150, is preferable.

<<First Ultrasonication>>

The treatment time in the first ultrasonication is not specifically limited but is preferably not less than 5 minutes and not more than 12 hours (for example, 30 minutes).

<<Second Ultrasonication>>

The treatment time in the second ultrasonication is not specifically limited but is preferably not less than 5 minutes and not more than 3 hours (for example, 30 minutes).

<<Solvothermal Synthesis (Hydrothermal Synthesis)>>

The solvothermal synthesis (hydrothermal synthesis) can be performed under any pressurization conditions without any specific limitations but is preferably performed at not lower than 1 MPa and not higher than 3 MPa.

The solvothermal synthesis (hydrothermal synthesis) can also be performed under any temperature conditions without any specific limitations but is preferably performed at not lower than 40° C. and not higher than 200° C. (for example, 150° C.).

The treatment time in the solvothermal synthesis (hydrothermal synthesis) is not specifically limited but is preferably not less than 2 hours and not more than 72 hours (for example, 12 hours).

<<Thermal-Vacuum Drying>>

The thermal-vacuum drying can be performed under any temperature conditions without any specific limitations but is preferably performed at not lower than 40° C. and not higher than 140° C. (for example, 60° C.).

(Electrode)

The presently disclosed electrode is an electrode that contains the presently disclosed catalyst. The presently disclosed electrode has excellent activity as an electrode.

The presently disclosed electrode can be formed by, for example, applying a dispersion liquid of the catalyst onto a substrate such as polyimide or poly(tetrafluoroethylene), drying the dispersion liquid to form a catalyst layer, and subsequently performing transfer thereof onto a conductive porous substrate such as carbon cloth or carbon paper by hot pressing. Alternatively, the electrode can be formed by applying the dispersion liquid of the catalyst onto the conductive porous substrate by die coating, spraying, or the like, and then drying the dispersion liquid. A solvent that is used in the dispersion liquid of the catalyst may be the dispersion medium that was described in relation to the production method of the catalyst. Although no specific limitations are placed on the content of the catalyst in the dispersion liquid, a content of 0.001 mass % to 10 mass % is appropriate.

The thickness of the catalyst layer in the presently disclosed electrode is not specifically limited but is approximately 0.005 μm to 100 μm. An appropriate amount of the catalyst in this catalyst layer is 0.1 mg/m$^2$ to $2\times10^4$ mg/m$^2$.

The presently disclosed electrode may suitably be used for electrolysis of water, for electrolysis of an organic substance, in a chargeable/dischargeable air battery, in a fuel cell (particularly as an electrode (air electrode, fuel electrode) of a polymer electrolyte fuel cell), or the like, for example.

(Membrane Electrode Assembly)

The presently disclosed membrane electrode assembly (MEA) is a membrane electrode assembly that includes the presently disclosed electrode. The membrane electrode assembly can be obtained through pressure bonding of the electrode to an ion exchange membrane. The "ion exchange membrane" is a product obtained by shaping an ion exchange resin into the form of a membrane and may, for example, be a proton conducting membrane, an anion exchange membrane, or the like.

The presently disclosed membrane electrode assembly may suitably be used in a chargeable/dischargeable air battery, a fuel cell (particularly a polymer electrolyte fuel cell), or the like.

(Air Battery)

The presently disclosed air battery is an air battery that includes the presently disclosed electrode or the presently disclosed membrane electrode assembly. Note that the term "air battery" refers to a battery in which oxygen in air is used as a positive electrode active material and in which a metal (zinc or lithium) is used as a negative electrode active material (i.e., a zinc-air battery or a lithium-air battery). In the air battery, a porous carbon material, a porous metal material, or a composite material of both thereof displaying catalytic action is typically used as an air electrode (positive electrode) in order that oxygen in air can be taken into the battery, any of various metals is typically used as a negative electrode, and an aqueous solution such as potassium hydroxide aqueous solution is typically used as an electrolyte solution. During discharging of the air battery, oxygen ($O_2$) in air is caused to dissolve in the electrolyte solution as $OH^-$ through the catalytic action of the air electrode (positive electrode), and reacts with a negative electrode active material to generate electromotive force. Conversely, the reverse reaction occurs during charging of the air battery. The presently disclosed electrode and membrane electrode assembly can be used as the positive electrode of the air battery. The presently disclosed air battery is useful as an automobile power supply, a household power supply, or a small power supply for a mobile device such as a mobile telephone or a portable computer, for example.

EXAMPLES

The following provides a more detailed description of the present disclosure through examples. However, the present disclosure is not in any way limited by the following examples.

(1) Evaluation of Oxygen Reduction Reaction (ORR) Catalytic Activity

Oxygen reduction reaction (ORR) catalytic activity was evaluated by performing linear sweep voltammetry (LSV) as described below and then calculating the onset potential and half-wave potential ($E_{1/2}$) of the oxygen reduction reaction (ORR). The results are shown in Table 1.

Specifically, a working electrode was immersed in 0.1 M (or 1 M) KOH electrolyte, a potential scan was made from high potential of 1.2 V (vs. RHE) toward low potential, and the current density was measured from reaction current that flowed in response thereto. The onset potential and half-wave potential ($E_{1/2}$) of the oxygen reduction reaction (ORR) were then calculated based on the measured current density.

Apparatus: Rotating ring disk electrode apparatus (produced by BAS Inc.; product name: RRDE-3A)
Electrolyte: 0.1 M or 1 M KOH
Working electrode: Electrode having 0.25 mg/cm² of catalyst produced in each example or comparative example loaded onto glassy carbon
Reference electrode: Ag/AgCl electrode or Hg/HgO electrode
Counter electrode: Platinum coil Note that values for the onset potential and half-wave potential ($E_{1/2}$) of the oxygen reduction reaction (ORR) that are shown in Table 1 are potentials (units: V) measured with a reversible hydrogen electrode (hydrogen electrode for which an electrolyte solution having the same pH as the pH of a solution in which the electrode that is a measurement subject is immersed is used) as a standard (vs. RHE), and larger values for both the onset potential and the half-wave potential ($E_{1/2}$) are more preferable.

(2) Evaluation of Oxygen Evolution Reaction (OER) Catalytic Activity

Oxygen evolution reaction (OER) catalytic activity was evaluated by performing linear sweep voltammetry (LSV) as described below and calculating the potential of the oxygen evolution reaction (OER) at 10 mAcm⁻². The results are shown in Table 1.

Specifically, a working electrode was immersed in 0.1 M (or 1 M) KOH electrolyte, a potential scan was made from 1.0 V (vs. RHE) in a positive direction, and the current density was measured from reaction current that flowed in response thereto. The potential of the oxygen evolution reaction (OER) was then calculated based on the measured current density.

Apparatus: Rotating ring disk electrode apparatus (produced by BAS Inc.; product name: RRDE-3A)
Electrolyte: 0.1 M or 1 M KOH
Working electrode: Electrode having 0.25 mg/cm² of catalyst produced in each example or comparative example loaded onto glassy carbon
Reference electrode: Ag/AgCl electrode or Hg/HgO electrode
Counter electrode: Platinum coil Note that the value for the potential of the oxygen evolution reaction (OER) that is shown in Table 1 is a potential (units: V) measured with a reversible hydrogen electrode (hydrogen electrode for which an electrolyte solution having the same pH as the pH of a solution in which the electrode that is a measurement subject is immersed is used) as a standard (vs. RHE), and a smaller potential (closer to 1.23 V) at 10 mAcm⁻² is more preferable.

(3) Evaluation of Catalyst Durability

Catalyst durability was evaluated by performing a chronopotentiometry test as described below with respect to catalysts produced in Examples 1 and 2. The results demonstrated that performance does not significantly change over 100 hours and that the catalysts produced in Examples 1 and 2 have good durability.

Specifically, a working electrode was immersed in 0.1 M (or 1 M) KOH electrolyte, was held at 0.88 V (vs. RHE), and the time dependence of potential was measured.

Apparatus: Rotating ring disk electrode apparatus (produced by BAS Inc.; product name: RRDE-3A)
Electrolyte: 0.1 M or 1 M KOH
Working electrode: Electrode having 0.25 mg/cm² of catalyst produced in Example 1 or 2 loaded onto glassy carbon
Reference electrode: Ag/AgCl electrode or Hg/HgO electrode
Counter electrode: Platinum coil (4) Characteristic Evaluation of Zinc-Air Battery A dispersion liquid for a positive electrode was produced by adding 5 mg of a catalyst B (NiFeS-SWCNT-NMP-60) produced in Example 2, described further below, 20 µL of a 20 weight % Nafion dispersion liquid (produced by Sigma-Aldrich), which is a perfluorocarbon material, 160 µL of isopropyl alcohol, and 40 µL of distilled water, and treating these materials for 1 hour in a bath-type ultrasonic disperser. The obtained dispersion liquid for a positive electrode was applied onto a gas diffusion layer (Sigracet GDL22BB produced by SGL Carbon Japan Co., Ltd.) using a brush such as to have a deposition amount after drying of 0.5 mg/cm², and was then dried to obtain a positive electrode member for a zinc-air battery. The produced positive electrode member and zinc foil of 0.1 mm in thickness serving as a negative electrode were each cut out as a circle of 17 mm in diameter. A separator and the negative electrode were stacked in order on the coated surface of the positive electrode member, and were then housed inside a coin-type outer container made of stainless steel. KOH aqueous solution of 6 mol/L in concentration was injected into the container such that no air remained, a stainless steel cap having a mesh structure was placed over the container and was fixed in place, and the battery can was sealed to thereby produce a zinc-air battery having a diameter of 20 mm and a thickness of 3.2 mm (coin cell CR2032). A zinc-air battery was also produced in the same manner using the catalyst system produced in Comparative Example 3, described further below, as a positive electrode catalyst.

Next, the specific capacity of each of these zinc-air batteries was measured. The zinc-air battery that was produced using the catalyst B as a positive electrode catalyst had a specific capacity of 817 mAh/g and displayed high performance. On the other hand, the zinc-air battery that was produced using the catalyst system of Comparative Example 3 in which fibrous carbon nanostructures were not used had a specific capacity of 52 mAh/g, demonstrating that fibrous carbon nanostructures play an extremely important role in zinc-air battery performance. This is presumed to be due to the characteristic nanostructure of Ni atoms-Fe atoms-thiourea formed in the catalyst B acting as a primary factor in high performance.

A charge/discharge characteristic was measured for the zinc-air battery that was produced with the catalyst B as a positive electrode catalyst. FIG. 1 illustrates the charge/discharge characteristic for the zinc-air battery that was produced with the catalyst B as a positive electrode catalyst. The discharge potential and the charge potential of this zinc-air battery were 1.21 V and 1.90 V, respectively, and the overpotential of the zinc-air battery was smaller than that of a conventional zinc-air battery, which indicates that this zinc-air battery has high performance. Although FIG. 1 only illustrates the charge/discharge characteristic up to 200 minutes, the trend of the charge/discharge characteristic did not change even after 1,200 minutes or more, demonstrating that the zinc-air battery has high charge/discharge cycling durability.

(Preparation of Single-Walled Carbon Nanotubes (SWCNTs))

Single-walled carbon nanotubes (SWCNTs) (produced by Zeon Nanotechnology Co., Ltd.; product name: ZEONANO® SG101 (ZEONANO is a registered trademark in Japan, other countries, or both)) were prepared as fibrous carbon nanostructures.

Physical properties of the single-walled carbon nanotubes (SWCNTs) were as follows.

BET specific surface area according to nitrogen gas adsorption: 1,400 m$^2$/g

Mass density: 0.03 g/cm$^3$

Average diameter (Av): 3.3 nm

Value (3σ) obtained by multiplying diameter sample standard deviation (a) by 3: 1.9 nm 3σ/Av: 0.58

Average length: 500 μm (Production of PBI-Coated SWCNTs (SWCNT-PBI))

After dispersing 15 mg of the prepared SWCNTs and 5 mg of polybenzimidazole (PBI) (produced by Sato Light Industrial Co., Ltd.; product name: Polybenzimidazole) in 40 mL of dimethylacetamide (DMAc), 3 hours of ultrasonication was performed using an ultrasonic disperser (produced by Branson; product name: Ultrasonic Cleaner 5580), filtration was performed using a membrane filter (produced by Advantec MFS, Inc.; product name: PTFE Membrane Filter T300A047A), and then vacuum drying was performed at room temperature using a vacuum dryer (produced by AS ONE Corporation; product name: Vacuum Dryer AVO-200SB-D) to produce PBI-coated SWCNTs (SWCNT-PBI).

(Production of Ni-Thiourea Tetracoordinate Compound)

A mixture of 0.58 g of nickel(II) nitrate and 1.04 g of thiourea was refluxed at 60° C. in n-butanol (50 mL) for 2 hours and was then gradually cooled to room temperature to produce a Ni-thiourea tetracoordinate compound (Ni(Thiourea)$_4$(NO$_3$)$_2$) in which four molecules of thiourea were coordinated with a Ni atom.

(Production of Fe-Thiourea Tetracoordinate Compound)

A mixture of 0.68 g of iron(II) chloride tetrahydrate and 1.04 g of thiourea was refluxed at 80° C. in ethanol (50 mL) for 2 hours and was then left overnight at 0° C. to produce an Fe-thiourea tetracoordinate compound (Fe(Thiourea)$_4$Cl$_2$) in which four molecules of thiourea were coordinated with an Fe atom.

Example 1

A catalyst A (NiFeS-SWCNT-PBI-80) was produced as described below, and then (1) evaluation of oxygen reduction reaction (ORR) catalytic activity, (2) evaluation of oxygen evolution reaction (OER) catalytic activity, and (3) evaluation of catalyst durability were performed with respect to the produced catalyst A.

<Production of Catalyst a (NiFeS-SWCNT-PBI-80)>

After subjecting 10 mg of the produced PBI-coated SWCNTs (SWCNT-PBI) to 2 hours of ultrasonication in 50 mL of methanol using an ultrasonic disperser (produced by Branson; product name: Ultrasonic Cleaner 5580), 20 mg of the Ni-thiourea tetracoordinate compound (Ni(Thiourea)$_4$(NO$_3$)$_2$) and 80 mg of the Fe-thiourea tetracoordinate compound (Fe(Thiourea)$_4$Cl$_2$) were added thereto, a further 30 minutes of ultrasonication was performed using the ultrasonic disperser (produced by Branson; product name: Ultrasonic Cleaner 5580), solvothermal synthesis (hydrothermal synthesis) was performed under conditions of 1 MPa to 2 MPa and 150° C. for 12 hours, and, after the reaction, thermal-vacuum drying was performed at 60° C. for 14 hours using a vacuum dryer (produced by AS ONE Corporation; product name: Vacuum Dryer AVO-200SB-D) to produce the catalyst A (NiFeS-SWCNT-PBI-80). In the catalyst A, the Ni atom content was 2.0 mass %, the Fe atom content was 8.6 mass %, the single-walled carbon nanotube content was 12.5 mass %, the polybenzimidazole (PBI) content was 4.2 mass %, and the thiourea content was 57.5 mass %.

Example 2

With the exception that a catalyst B (NiFeS-SWCNT-NMP-60) was produced as described below instead of producing the catalyst A (NiFeS-SWCNT-PBI-80) as described above in Example 1, (1) evaluation of oxygen reduction reaction (ORR) catalytic activity, (2) evaluation of oxygen evolution reaction (OER) catalytic activity, and (3) evaluation of catalyst durability were performed in the same way as in Example 1. The results are shown in Table 1.

<Production of Catalyst B (NiFeS-SWCNT-NMP-60)>

After subjecting 60 mg of single-walled carbon nanotubes (SWCNTs) (produced by Zeon Nanotechnology Co., Ltd.; product name: ZEONANO® SG101) dispersed in 19.94 g of N-methylpyrrolidone (NMP) to 2 hours of ultrasonication in 50 mL of methanol using an ultrasonic disperser (produced by Branson; product name: Ultrasonic Cleaner 5580), 40 mg of the Ni-thiourea tetracoordinate compound (Ni(Thiourea)$_4$(NO$_3$)$_2$) and 60 mg of the Fe-thiourea tetracoordinate compound (Fe(Thiourea)$_4$Cl$_2$) were added thereto, a further 30 minutes of ultrasonication was performed using the ultrasonic disperser (produced by Branson; product name: Ultrasonic Cleaner 5580), solvothermal synthesis (hydrothermal synthesis) was performed under conditions of 1 MPa to 2 MPa and 150° C. for 12 hours, and then thermal-vacuum drying was performed at 60° C. using a vacuum dryer (produced by AS ONE Corporation; product name: Vacuum Dryer AVO-200SB-D) to produce the catalyst B (NiFeS-SWCNT-NMP-60). In the catalyst B, the Ni atom content was 3.0 mass %, the Fe atom content was 4.9 mass %, the single-walled carbon nanotube content was 37.5 mass %, and the thiourea content was 42.1 mass %.

Example 3

With the exception that 40 mg of the Ni-thiourea tetracoordinate compound and 60 mg of the Fe-thiourea tetracoordinate compound were added so as to obtain a catalyst C (NiFeS-SWCNT-PBI-60) instead of adding 20 mg of the Ni-thiourea tetracoordinate compound and 80 mg of the Fe-thiourea tetracoordinate compound so as to obtain the catalyst A (NiFeS-SWCNT-PBI-80) in Example 1, catalyst production, (1) evaluation of oxygen reduction reaction (ORR) catalytic activity, and (2) evaluation of oxygen evolution reaction (OER) catalytic activity were performed in the same way as in Example 1. The results are shown in Table 1. In the catalyst C, the Ni atom content was 4.0 mass %, the Fe atom content was 6.5 mass %, the single-walled carbon nanotube content was 12.5 mass %, the polybenzimidazole (PBI) content was 4.2 mass %, and the thiourea content was 56.1 mass %.

Comparative Example 1

With the exception that a catalyst D (Pt/C) produced as described below was used instead of using the catalyst A (NiFeS-SWCNT-PBI-80) as a catalyst in Example 1, (1) evaluation of oxygen reduction reaction (ORR) catalytic activity and (2) evaluation of oxygen evolution reaction (OER) catalytic activity were performed in the same way as in Example 1. The results are shown in Table 1.

<Preparation of Catalyst D (Pt/C)>

A commercially available product (produced by Tanaka Kikinzoku) was used as the catalyst D (Pt/C).

Comparative Example 2

With the exception that a catalyst E (IrO$_2$/C) produced as described below was used instead of using the catalyst A (NiFeS-SWCNT-PBI-80) as a catalyst in Example 1, (1) evaluation of oxygen reduction reaction (ORR) catalytic activity and (2) evaluation of oxygen evolution reaction (OER) catalytic activity were performed in the same way as in Example 1. The results are shown in Table 1.

<Production of Catalyst E (IrO$_2$/C)>

The catalyst E (IrO$_2$/C) was produced by adding Ir/carbon black (Ir/C) obtained through refluxing of IrCl$_3$·xH$_2$O (7.9 mg) and carbon black (10 mg) to 60% ethylene glycol aqueous solution (20 mL) and then performing heating thereof in a N$_2$ atmosphere at 160° C. for 6 hours.

Comparative Example 3

With the exception that the operation of ultrasonicating 10 mg of the produced PBI-coated SWCNTs (SWCNT-PBI) in 50 mL of methanol for 2 hours was not performed (i.e., the produced PBI-coated SWCNTs (SWCNT-PBI) were not used), catalyst production, (1) evaluation of oxygen reduction reaction (ORR) catalytic activity, and (2) evaluation of oxygen evolution reaction (OER) catalytic activity were performed in the same way as in Example 3. The results are shown in Table 1.

Comparative Example 4

With the exception that the operation of ultrasonicating 10 mg of the produced PBI-coated SWCNTs (SWCNT-PBI) in 50 mL of methanol for 2 hours was not performed (i.e., the produced PBI-coated SWCNTs (SWCNT-PBI) were not used), catalyst production, (1) evaluation of oxygen reduction reaction (ORR) catalytic activity, and (2) evaluation of oxygen evolution reaction (OER) catalytic activity were performed in the same way as in Example 1. The results are shown in Table 1.

TABLE 1

| | | | | | Evaluation | | | |
| --- | --- | --- | --- | --- | --- | --- | --- | --- |
| | | Catalyst | | | Catalytic activity | | | |
| | Catalyst name | Used catalyst sample | Ni/Fe ratio (mass ratio as thiourea tetracoordinate compound) | BET specific surface area of carbon nanotubes (m$^2$/g) | Onset potential of oxygen reduction reaction (ORR) (vs. RHE) (units: V) | Half-wave potential ($E_{1/2}$) of oxygen reduction reaction (ORR) (vs. RHE) (units: V) | Potential of oxygen evolution reaction (OER) at 10 mAcm$^{-2}$ (units: V) | Durability |
| Example 1 | Catalyst A | NiFeS-SWCNT-PBI-80 | 20/80 | 1400 | 0.95 | 0.82 | 1.51 | Good |
| Example 2 | Catalyst B | NiFeS-SWCNT-NMP-60 | 40/60 | 1400 | 0.92 | 0.82 | 1.55 | Good |
| Example 3 | Catalyst C | NiFeS-SWCNT-PBI-60 | 40/60 | 1400 | 0.98 | 0.74 | 1.67 | — |
| Comparative Example 1 | Catalyst D | Pt/C | — | — | 0.91 | 0.82 | — | — |
| Comparative Example 2 | Catalyst E | IrO$_2$/C | — | — | — | — | 1.62 | — |
| Comparative Example 3 | Catalyst F | NiFeS-60 | 40/60 | — | 0.89 | 0.77 | 1.84 | — |
| Comparative Example 4 | Catalyst G | NiFeS-80 | 20/80 | — | 0.95 | 0.78 | 1.80 | — |

It can be seen from the results shown in Table 1 that the catalysts of Examples 1 to 3, which each include (A) Ni atoms and Fe atoms, (B) thiourea, and (C) SWCNTs as fibrous carbon nanostructures, have oxygen reduction reaction (ORR) catalytic activity that is at least equivalent to that of the catalyst D (Pt/C) and have oxygen evolution reaction (OER) catalytic activity that is at least equivalent to that of the catalyst E (Pt/C).

Moreover, it can be seen from the results of evaluation of catalyst durability that the catalysts produced in Examples 1 and 2 have good durability.

INDUSTRIAL APPLICABILITY

According to the present disclosure, it is possible to provide a catalyst that has excellent oxygen reduction reaction (ORR) and oxygen evolution reaction (OER) catalytic activity and is useful as a catalyst for water electrolysis, an electrode catalyst for an air battery, or the like. Moreover, according to the present disclosure, it is possible to provide an electrode that contains the aforementioned catalyst, a membrane electrode assembly that includes the aforementioned electrode, and a chargeable/dischargeable air battery that includes the aforementioned electrode or the aforementioned membrane electrode assembly.

The presently disclosed catalyst is suitable for use in a zinc-air battery, for water decomposition, in a fuel cell, or the like.

The invention claimed is:

1. A catalyst comprising:
   (A) Ni atoms and Fe atoms;
   (B) thiourea; and
   (C) fibrous carbon nanostructures;
   wherein the thiourea is coordinated with the Ni atoms and the Fe atoms, and
   a mass ratio of content of a Ni-thiourea coordination compound relative to content of an Fe-thiourea coordination compound, expressed as Ni-thiourea coordination compound/Fe-thiourea coordination compound, is not less than 5/95 and not more than 70/30.

2. The catalyst according to claim 1, further comprising (D) a polymer represented by general formula (1), shown below, General Formula (1)

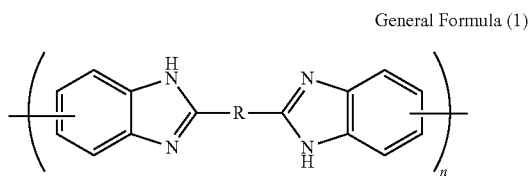

where, in general formula (1), R indicates a phenylene group or a divalent group represented by structural formula (X), shown below, Structural Formula (X)

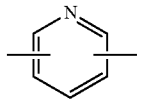

and n is an integer of 10 or more.

3. The catalyst according to claim 1, wherein the fibrous carbon nanostructures are single-walled carbon nanotubes.

4. The catalyst according to claim 1, wherein the fibrous carbon nanostructures have a specific surface area of 800 $m^2/g$ or more.

5. An electrode comprising the catalyst according to claim 1.

6. A membrane electrode assembly comprising the electrode according to claim 5.

7. An air battery comprising the electrode according to claim 5.

8. An air battery comprising the membrane electrode assembly according to claim 6.

* * * * *